Dec. 3, 1940. I. E. COFFEY Re. 21,641
CARBURETOR THROTTLE CONTROL
Original Filed June 24, 1937 2 Sheets-Sheet 1
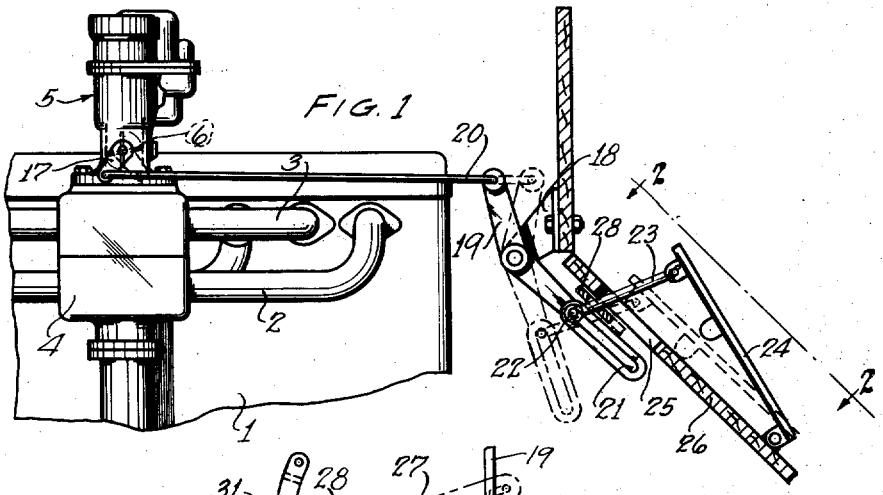
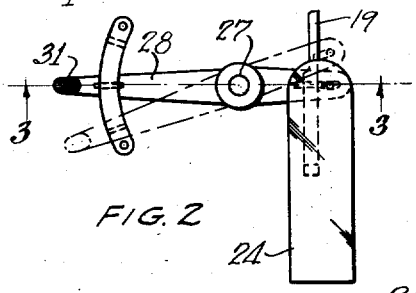
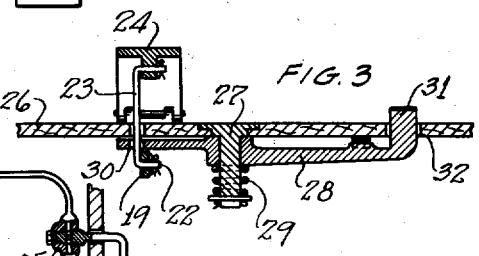
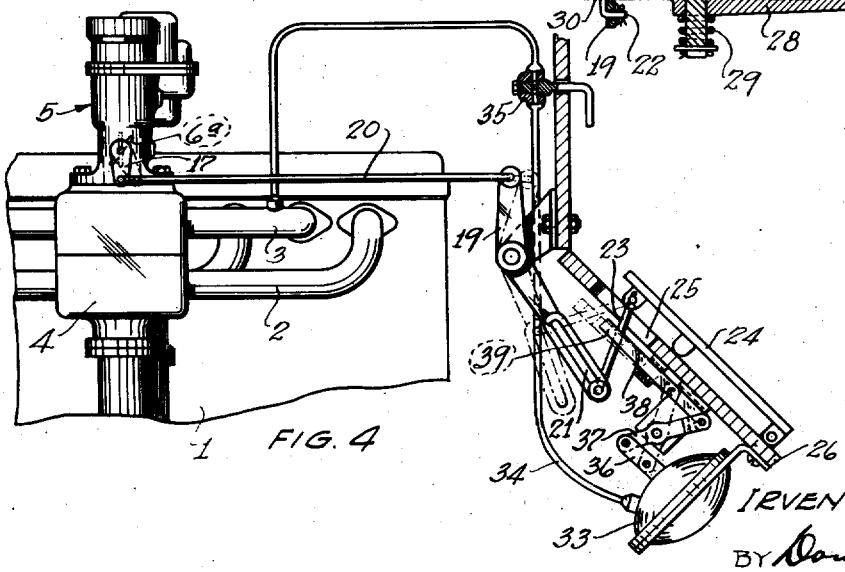
INVENTOR.
IRVEN E. COFFEY
BY Donald H. Rich
ATTORNEY.

Dec. 3, 1940. I. E. COFFEY Re. 21,641

CARBURETOR THROTTLE CONTROL

Original Filed June 24, 1937 2 Sheets-Sheet 2

INVENTOR
IRVEN E. COFFEY
BY Donald U. Rich
ATTORNEY

Reissued Dec. 3, 1940 Re. 21,641

UNITED STATES PATENT OFFICE 21,641

CARBURETOR THROTTLE CONTROL

Irven E. Coffey, Normandy, Mo., assignor to Carter Carburetor Corporation, St. Louis, Mo., a corporation of Delaware Original No. 2,148,729, dated February 28, 1939, Serial No. 150,187, June 24, 1937. Application for reissue June 8, 1940, Serial No. 339,581

16 Claims. (Cl. 123—98)

This invention relates to carburetors for automobile engines and consists particularly in novel throttle control means therefor.

Modern automotive carburetors are usually provided with means for increasing the richness of mixture supplied when the associated engine is being subjected to abnormally heavy loads. Such condition is ordinarily accompanied by substantial opening of the throttle valve and relatively low suction in the intake passages. The additional richness may be obtained by means for increasing the effective size of the main metering orifice or by a device for opening an auxiliary fuel supply to the mixture conduit and the auxiliary enrichener may be controlled manually with the throttle valve or by means of a suction actuated mechanism. In the case of a manual enrichener such as a throttle-controlled, stepped metering rod cooperating with the main metering orifice, the power step of the metering rod must necessarily be brought into operative relationship with the metering orifice whenever the throttle is opened to the predetermined degree regardless of the rate of speed or the load applied to the engine. The additional richness provided by the power step at low speeds is essential for obtaining maximum power from the engine, but during acceleration and high speed operation, this extra richness accounts for only slight if any improved performance and is not essential.

The average automobile driver rarely subjects his engine to conditions requiring maximum power and, accordingly, seldom actually needs the additional richness which accompanies full opening of the throttle valve. Such a driver is ordinarily not sufficiently skilled to operate the throttle valve in the most economical manner, though it could be so operated without noticeably affecting the operation of his car. Consequently, when he desires rapid acceleration or increased power, he depresses his throttle pedal much more than is necessary and wastes fuel. Substantial opening movement of the carburetor throttle valve at an excessive rate, as the driver is frequently prone to do, particularly in traffic, has the additional disadvantage that the engine cannot respond at a corresponding rate and, consequently, the suction in the engine intake may drop excessively, with the result that the engine may accelerate at a slower rate than would have been the case if the throttle had been opened more gradually.

An object of the present invention is to provide means for selectively limiting the degree to which the carburetor throttle valve may be opened.

Another object is to provide manual means for varying the effective relationship between the throttle and its control pedal or lever.

Another object is to provide automatic means for limiting the degree to which the throttle valve may be opened when normal driving conditions prevail while permitting greater or full opening of the throttle under other conditions.

Another object is to provide means for making operation of the throttle valve easier for city or other driving when repeated variation of the throttle position is necessary.

Another object is to provide operative mechanism for connecting the throttle pedal and throttle valve incorporating a resilient device for preventing opening of the throttle valve at a rate faster than the engine can respond.

Still another object is to provide novel throttle operating mechanism designed to function as an anti-stall device.

These objects and other more detailed objects hereafter appearing are attained substantially by the devices illustrated in the accompanying drawings, in which:

Fig. 1 is a view, partly in section, showing parts of an internal combustion engine and carburetor control mechanism therefor.

Fig. 2 is a view of the mechanism taken on line 2—2 of Fig. 1, the flooring being omitted.

Fig. 3 is a section taken substantially on line 3—3 of Fig. 2.

Fig. 4 is a view similar to Fig. 1, but showing a modification.

Figure 6:
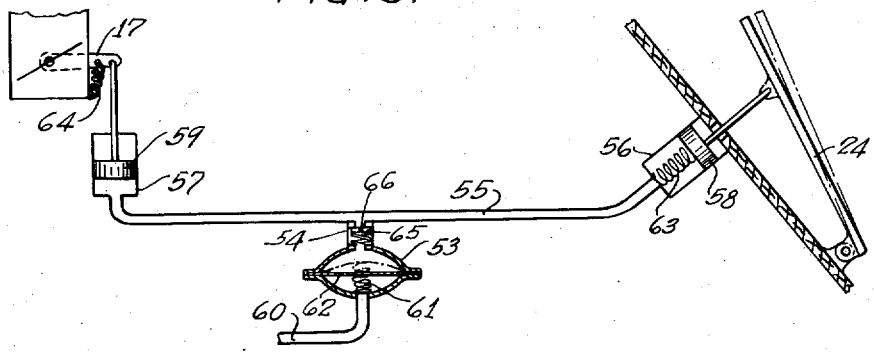

Fig. 6 diagrammatically illustrates still another form.

Figure 5:
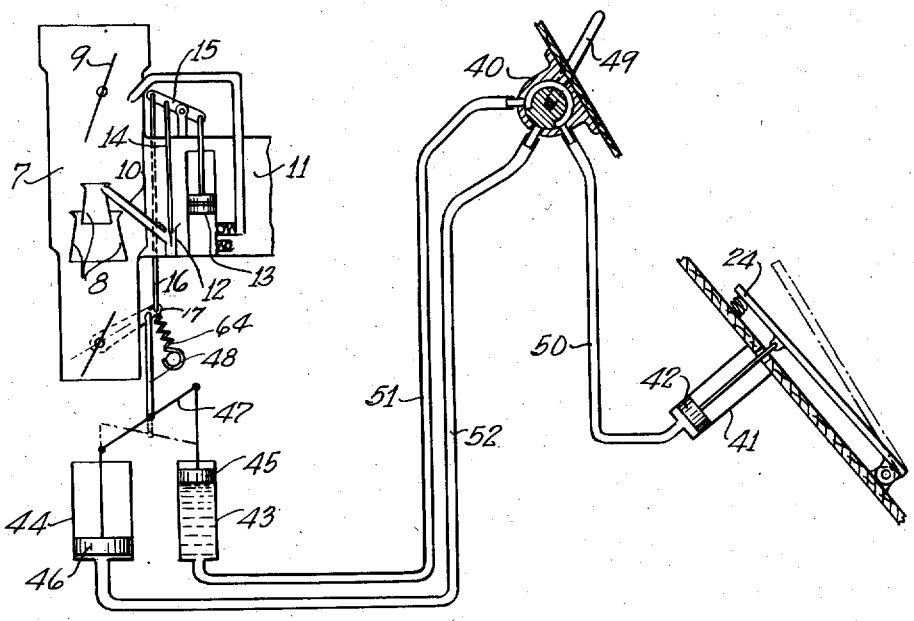
Fig. 5 is a diagrammatic representation showing operative parts of a carburetor and another form of the invention.

Figs. 1 and 4 show a portion of internal combustion engine 1, of the usual automotive type, having exhaust manifold 2 and intake manifold 3 merging in hot spot construction 4 for applying exhaust heat to the intake gases. Mounted on the hot spot is a carburetor, generally indicated at 5, having a throttle valve 6 mounted near the outlet portion thereof. As shown in Fig. 5, the carburetor also includes a downdraft mixture conduit at 7, venturis 8, choke valve 9, and main nozzle 10. Adjacent the mixture conduit is a constant level chamber 11 having the usual float controlled inlet valve mechanism (not shown). Fuel is supplied to main nozzle 10 through metering orifice member 12 and accelerating fuel is supplied from pump 13. The effective size of orifice member 12 may be varied by movement of the stepped metering rod 14 carried by rock lever 15 manually controlled with the throttle valve through link 16 and arm 17 rigid with the throttle shaft. Accelerating pump 13 is also manually controlled from the throttle.

Pivoted at a bracket 18 projecting from the flooring or frame adjacent the driver's seat is a rock lever 19 connected at one end with the throttle arm 17 by means of a link 20. The opposite extremity of lever 19 is provided with a slot 21 which slidably receives the bent over end portion 22 of push rod 23 secured at its upper end to the usual throttle control pedal 24. Rod 23 passes through an opening 25 in the flooring 26.

A pintle 27 depending from a portion of flooring 26 spaced laterally from rock lever 19 pivotally mounts a lever 28 extending substantially at a right angle to lever 19 and paralleling flooring 26. Lever 28 is yieldably held in position against flooring 26 by a coiled spring 29 which also prevents rattling. This lever has an opening 30 at one end loosely receiving throttle push rod 23 and an upstanding toe 31 extending through a slot 32 in the flooring in position to be actuated by contact of the driver's foot.

Push rod 23, in Fig. 1, is at the inner extremity of slot 21 in which position full movement of pedal 24 to the dotted line position shown fully opens the throttle valve. In case the operator wishes to obtain maximum economy which accompanies restriction of the degree to which the throttle may be opened, lever 28 may be manually rotated counterclockwise, with reference to Fig. 2, so as to move push rod 23 to the outer extremity of slot 21. Such movement increases the leverage relationship between the throttle valve and its control pedal, or, in other words, varies the mechanical advantage of the throttle control mechanism so that full movement of pedal 24 produces only partial opening movement of the throttle valve. Obviously the maximum degree to which the throttle may be opened by the pedal may be varied by merely moving push rod 23 to different positions in slot 21. With rod 23 at the outer end of slot 21, the throttle valve can be opened only to the position indicated in Fig. 5 with the larger or so-called economy step of metering rod 14 still restricting metering orifice.

In Fig. 4 the throttle control mechanism is the same as that shown in the previous form, and a modified form of mechanism, for varying the mechanical advantage between the throttle valve and its control pedal is shown. This mechanism comprises a suction actuated device shown conventionally at 33, in which a diaphragm (not shown) is normally urged to the right by a spring. The suction device is connected to intake manifold 3 by means of a tube 34 in which is interposed a manual shutoff valve 35. Suction device 33 operates a rod 36 which is connected by means of a pivoted lever 37 to a reach rod or link 38 having an aperture 39 loosely receiving throttle push rod 23. This rod is shown in solid lines at the outer end of slot 21 to which position it is moved when relatively high suctions prevail in the intake manifold. In this position of parts, the throttle valve is only partially opened, as indicated at 6a, when pedal 24 is fully depressed.

Fig. 4 also shows in dot and dash lines the throttle push rod moved to the inner end of slot 21 to permit full operation of the throttle, such movement being effected when suction in the intake manifold drops below a predetermined value. Valve 35 provides for manually cutting off suction applied to suction device 33, whereupon push rod 23 will be moved to and held in the broken line position.

The calibration of the suction device and connections shown in Fig. 4 varies with different engines. Preferably, device 33 should move rod 23 from the solid line position in Fig. 4 to the broken line position when the suction in the intake manifold drops from a value corresponding to, say, eight to ten inches of mercury to a value corresponding to four to seven inches of mercury. Thus, when the suction in the intake manifold exceeds the top suction limit mentioned, which condition prevails during most normal driving, the throttle connections will be adjusted for the most economical operation. In case, however, the intake suction drops, as when the engine is subjected to an abnormal load or the throttle is opened quickly, push rod 23 will be automatically slid along slot 21 to permit a greater opening of the throttle valve. Such a movement of the push rod will also occur in case the engine speed tends to become slower and the throttle pedal is held stationary with the result that the throttle will be automatically opened and additional power provided.

Figs. 5 and 6 illustrate diagrammatically hydraulic or pneumatic arrangements for operating the throttle valve. In Fig. 5, a valve 40 controls the branched fluid connection between primary cylinder 41, receiving piston 42 connected to throttle pedal 24 and secondary cylinders 43 and 44 having pistons 45 and 46 connected to throttle arm 17 by balance lever 47 and link 48. Valve 40 has an operating handle 49 easily accessible to the driver of the vehicle for connecting primary tube 50 with either of the tubes 51 or 52. When cylinder 41 is opened to cylinder 43 by means of valve 40, full depression of pedal 24 fully opens the throttle valve. In case valve 40 is set to connect the primary cylinder to cylinder 44, which is larger than cylinder 43, full movement of the pedal operates the throttle valve only to the partially open position shown with the economy step of the metering rod still in the metering orifice, as explained above.

In Fig. 6, a suction device 53 somewhat similar to that in Fig. 4 communicates through tube 54 with the fluid connection 55 connecting hydraulic cylinders 56 and 57. Piston 58 in cylinder 56 is connected to pedal 24 and piston 59 in cylinder 57 is connected to throttle arm 17.

A spring loaded check valve 65 in tube 64, has a restricted central aperture 66 whereby the valve impedes movement of the hydraulic fluid from the suction device into connection 55 but offers substantially no resistance to passage of the fluid through tube 54 in the opposite direction.

When a substantial drop occurs in the intake suction communicated to device 53 through conduit 60, spring 61 moves diaphragm 62 upwardly. This movement forces a part of the fluid from the suction device into tube 55 and cylinder 56 fully raising piston 58 and pedal 24. When the suction device is thus discharged, so to speak, full depression of pedal 24 operates the throttle throughout its full range. When the engine stops and pedal 24 is released, spring 61, being stronger than either spring 63 or spring 64, forces still more fluid into connection 55 elevating piston 59, since pedal piston 58 at the top end of its stroke, and slightly opening the throttle preparatory to restarting the engine. Such automatic reopening of the throttle occurs as slowly as desirable due to the restriction at check 55. Because of this feature, the device is also effective to prevent stalling while the engine is idling. Under such conditions, diaphragm 62 ordinarily would be drawn downwardly by the high idling suction, but any reduction of this suction, as in case the engine starts to hesitate prior to a stall, will be accompanied by corresponding expansion of spring 61 and opening of the throttle to accelerate the engine due to forcing of liquid into cylinder 57.

When the intake suction is relatively high, as is the case under most normal driving conditions, diaphragm 62 will be lowered against spring 61, drawing fluid from connection 55 into the suction device. Thereafter, until the suction again drops, the throttle pedal will be only partially raised when the throttle is fully closed by its return spring and consequently depression of the pedal from such position can only partially open the throttle.

The device 53 constitutes a resilient chamber for receiving a part of the hydraulic fluid when the throttle pedal is depressed at a rapid rate, regardless of the suction effect upon the diaphragm 62, and thereafter discharging the same gradually into the hydraulic line. As such, the device prevents the throttle valve from being opened too rapidly, a desirable function since when the throttle is quickly opened, the suction in the engine intake system drops very low, due to the inability of the engine to accelerate at a corresponding rate. As a result, the rate of fuel discharge from the carburetor nozzle is sharply reduced and such fuel as is supplied by the carburetor may collect on the walls of the intake manifold, instead of being carried into the cylinders by the air flow. Accordingly, the engine will actually accelerate faster if the throttle valve is opened at a moderate rate which approaches the rate at which the engine will respond, than if the valve is more quickly opened. The insertion of the collapsible chamber 53 into the hydraulic line permits the driver to depress the pedal as rapidly as he likes to obtain acceleration at the maximum rate, without experiencing substantially increased resistance to the pedal action.

The invention is shown applied to a type of carburetor having a metering rod controlled manually with the throttle valve and the adjustment of such device obviously depends upon the relationship between the throttle valve and the power step of the fuel metering rod. Where the invention is used with the suction step-up type of carburetor, adjustment of the various mechanisms will depend on the suction condition in the intake or carburetor at which the suction step-up device is arranged to provide the increased richness. Suction device 33 should move rod 23 to the inner end of slot 21 before the intake manifold suction drops sufficiently to cause functioning of the auxiliary enriching device. An example of a form of suction step-up device is shown in a co-pending application of Leland B. Read, Serial No. 129,786, filed March 9, 1937. The invention is adapted for application to all types of throttle controlled, internal combustion engines.

An additional advantage of the invention results from the fact that varying the mechanical advantage of the throttle control mechanism not only limits the extent to which the throttle valve may be opened but also makes opening of the valve against the throttle return spring (not shown) substantially easier. The invention contemplated broadly varying the mechanical advantage of the throttle control mechanism, however, effected.

Various parts of the structures shown are not essential and these may be modified as will occur to those skilled in the art. The exclusive use of all such modifications as come within the scope of the appended claims is contemplated.

I claim:

1. In combination, a carburetor throttle valve element, a manual control element therefor, and mechanism for varying the operative relationship between said elements comprising a pivoted lever having a recess, a link connecting one of said elements with a portion of said lever spaced from said recess, and a link extending from the other of said elements to said recess and movable therein to vary the leverage relationship between said elements.

2. In combination, a carburetor throttle valve, a manual control element therefor, a pivoted lever having a slot, a link connecting said valve with a portion of said lever spaced from said slot, a second link connecting said control element with said slot, and structure extending from said second link and accessible with said control element for moving said second link in said slot to vary the operative relationship between said control element and said valve.

3. The combination of elements specified in claim 2 constructed and arranged so that full movement of said control element is capable of moving said throttle valve only to a partially open position when said second link is in a predetermined position in said slot.

4. In combination, a carburetor throttle valve element, a control element therefor, a pivoted lever having a recess, a link connecting one of said elements and a portion of said lever spaced from said recess, a second link connecting the other of said elements with said recess, and a suction actuated device connected to said second link for moving thhe same in said recess to vary the operative relationship between said control and valve elements.

5. In an internal combustion engine, intake structure including a carburetor mixture conduit, a throttle valve element in said conduit, a control element for said valve, leverage mechanism connecting said elements, and means including a member responsive to suction in said intake structure for varying the mechanical advantage of said mechanism to vary the operative relationship between said elements.

6. The combination of elements specified in claim 4 in which said mechanism and said means are constructed and arranged so that when relatively high suctions prevail in said intake structure, full movement of said control element produces only partial opening movement of said throttle valve element.

7. In combination, a carburetor throttle valve, fluid pressure mechanism including a manual control for operating said valve, and means for varying the effective relationship between said control and said valve, said mechanism including separate devices operable to provide different operative relationships between said valve and said control, said means functioning to render said devices selectively operative.

8. In combination, a carburetor throttle valve, a manual control therefor, a primary fluid pressure device connected to said control, a pair of secondary fluid pressure devices connected to said valve, and constructed and arranged to variably translate fluid pressures transmitted from said primary device, fluid connections between said devices, and valve means for selectively connecting said primary device to said secondary devices.

9. In combination, a carburetor throttle valve, a manual control therefor, a fluid pressure operative connection between said valve and said control, and a suction operated device for selectively withdrawing fluid from said connection and returning the same thereto according to suction conditions in the intake of an associated engine.

10. Structure as specified in claim 9 in which said suction operated device functions to vary the effective size of said connection according to suction conditions in the intake of an associated engine.

11. In combination with an internal combustion engine, a carburetor throttle valve, a manual control therefor, and means selectively responsive to operative conditions in the engine for varying the effective relationship between said valve and said control, said means being constructed and arranged to partially open said valve when the engine is inoperative.

12. In combination with a carburetor throttle valve, a manual throttle control, an hydraulic system forming an operative connection between the throttle and said control, and a resiliently expansible and contractible chamber member communicating with said system for receiving a part of the fluid therein when said control is actuated whereby the consequent movement of the throttle occurs at a slower rate than the corresponding movement of said control.

13. The combination as specified in claim 12 in which the resilience of said chamber member is adapted to permit entry of fluid thereinto from said system only when said control is actuated faster than a predetermined rate whereby movement of said control at such faster rate produces relatively slower movement of the throttle valve.

14. The combination specified in claim 12 further including a check valve in the communication between said system and said chamber member disposed to seat under the influence of fluid flow from said chamber member to restrict said flow and to unseat under the influence of the influence of fluid flow into said member.

15. In combination with a carburetor throttle member, a manual control member therefor, and passaged structure forming an hydraulic operating connection between said members, said structure including a resiliently expansible portion yieldable when greater than a predetermined pressure exists in said structure for retarding the response of said throttle member to movement of said control member.

16. In combination with an internal combustion engine, a carburetor throttle member, a manual throttle control member, an hydraulic operating connection between said members, expansible and contractible chamber structure communicating with said connection, a suction connection between said structure and the engine intake whereby engine suction tends to expand said structure, and spring means opposing the suction effect upon said structure and adapted to contract said structure when the engine suction drops so as to force fluid into said connection and open the throttle member.

IRVEN E. COFFEY.